US010991249B2

(12) United States Patent
Reisbick et al.

(10) Patent No.: US 10,991,249 B2
(45) Date of Patent: Apr. 27, 2021

(54) RADAR-AUGMENTATION OF PARKING SPACE SENSORS

(71) Applicant: Parkifi, Inc., Englewood, CO (US)

(72) Inventors: Richard Reisbick, Westminster, CO (US); Ryan Sullivan, San Francisco, CA (US)

(73) Assignee: Parkifi, Inc., Englewood, CO (US)

( * ) Notice: Subject to any disclaimer, the term of this patent is extended or adjusted under 35 U.S.C. 154(b) by 0 days.

(21) Appl. No.: 16/697,776

(22) Filed: Nov. 27, 2019

(65) Prior Publication Data

US 2020/0175868 A1 Jun. 4, 2020

Related U.S. Application Data

(60) Provisional application No. 62/773,596, filed on Nov. 30, 2018.

(51) Int. Cl.
*G08G 1/082* (2006.01)
*G08G 1/14* (2006.01)
(Continued)

(52) U.S. Cl.
CPC ......... *G08G 1/142* (2013.01); *G06K 9/00771* (2013.01); *G06K 9/325* (2013.01);
(Continued)

(58) Field of Classification Search
CPC ..... H04W 4/40; H04W 4/021; H04W 40/244; H04W 4/024; H04W 4/38; H04W 4/70;
(Continued)

(56) References Cited

U.S. PATENT DOCUMENTS 8,102,799 B2  1/2012  Alexander et al.
8,816,879 B2 * 8/2014  Stefik ..................... G06Q 10/02
                                                340/932.2
(Continued)

FOREIGN PATENT DOCUMENTS

WO      03/029046 A1   4/2003
WO   2009/079779 A1   7/2009
WO   2017/107123 A1   6/2017

OTHER PUBLICATIONS

U.S. Appl. No. 62/773,504 entitled "Host-Neutral Gateway Processing System," filed Nov. 30, 2018, Inventor: Ryan Sullivan, et al.
(Continued)

*Primary Examiner* — Daniel Previl
(74) *Attorney, Agent, or Firm* — Kilpatrick Townsend & Stockton LLP

(57) ABSTRACT

Various arrangements for monitoring occupancy of multiple parking spaces are presented herein. Arrangements may use a radar-based vehicle detector that comprises a radar antenna that has a field-of-view of a portion of a parking facility. Multiple parking sensors may be present that monitor parking spaces outside of or obstructed from the field-of-view. A parking host system may be present that communicates with the radar-based vehicle detector and the plurality of parking sensors and determines in which parking space a vehicle has parked.

20 Claims, 9 Drawing Sheets

(51) Int. Cl.
  *G08G 1/04* (2006.01)
  *G06K 9/32* (2006.01)
  *G06K 9/00* (2006.01)
  *G06T 7/20* (2017.01)
  *G08G 1/017* (2006.01)

(52) U.S. Cl.
  CPC .............. *G06T 7/20* (2013.01); *G08G 1/0175* (2013.01); *G08G 1/04* (2013.01); *G08G 1/146* (2013.01); *G06K 2209/15* (2013.01)

(58) Field of Classification Search
  CPC ....... H04W 4/80; H04W 84/18; H04W 88/16; H04W 4/026; H04W 4/027; H04W 4/12; H04W 4/46; H04W 52/04; H04W 72/005; H04W 76/14; H04W 76/40; H04W 12/00502; H04W 12/00503; H04W 12/06; G08G 1/14; G08G 1/168; G08G 1/052; G08G 1/096791; G08G 1/144; G08G 1/147; G08G 1/148; G08G 1/0112; G08G 1/0116; G08G 1/0133; G08G 1/0145; G08G 1/142; G08G 1/042; G01C 21/34; G01S 19/13; G01S 19/39; G01S 13/04; G01S 13/26; G01S 13/325; G01S 13/36; G01S 13/86; G01S 13/88; G01S 7/2922; H04L 12/28; H04L 1/08; H04L 67/125; H04L 67/12; H04L 67/141; H05B 47/105; H05B 47/11; H05B 47/19; Y02B 20/46; B60W 2050/146; B60W 2520/10; B60W 2540/24; B60W 2540/26; B60W 2554/00; B60W 50/14; G06Q 2240/00; G06Q 10/02; G06F 3/167
  USPC ............ 340/932, 426, 901, 907, 932.2, 937, 340/990–995.1, 995.13, 426.22, 825.19
  See application file for complete search history.

(56) References Cited

U.S. PATENT DOCUMENTS

| | | | |
|---|---|---|---|
| 8,823,520 B2 | 9/2014 | Ly et al. | |
| 10,104,454 B2 | 10/2018 | Sullivan et al. | |
| 2002/0027499 A1* | 3/2002 | Chainer | G07C 5/008 340/426.24 |
| 2005/0280555 A1 | 12/2005 | Warner | |
| 2006/0136131 A1 | 6/2006 | Dugan et al. | |
| 2007/0050240 A1 | 3/2007 | Belani et al. | |
| 2008/0129544 A1 | 6/2008 | Augst | |
| 2008/0274766 A1 | 11/2008 | Pratt et al. | |
| 2008/0294020 A1 | 11/2008 | Sapounas | |
| 2010/0085948 A1 | 4/2010 | Yu | |
| 2011/0163894 A1 | 7/2011 | Grievink et al. | |
| 2013/0073350 A1* | 3/2013 | Blustein | G08G 1/14 705/13 |
| 2013/0311140 A1 | 11/2013 | Schechter | |
| 2014/0072178 A1* | 3/2014 | Carbonell | G06K 9/00785 382/105 |
| 2014/0343891 A1 | 11/2014 | Becker et al. | |
| 2015/0310745 A1* | 10/2015 | Osment | G06K 9/00771 348/143 |
| 2015/0369618 A1* | 12/2015 | Barnard | H04W 4/40 701/491 |
| 2015/0381737 A1 | 12/2015 | Quinn et al. | |
| 2016/0292808 A1 | 10/2016 | Blandin et al. | |
| 2017/0025008 A1* | 1/2017 | Gignac | G08G 1/146 |
| 2017/0092130 A1* | 3/2017 | Bostick | G08G 1/144 |
| 2017/0098374 A1 | 4/2017 | Sullivan et al. | |
| 2017/0129483 A1* | 5/2017 | Li | G05D 1/0297 |
| 2017/0134536 A1 | 5/2017 | Tessiore et al. | |
| 2017/0148230 A1* | 5/2017 | Richard | G01S 13/325 |
| 2018/0198641 A1 | 7/2018 | Gilani et al. | |
| 2018/0286237 A1 | 10/2018 | Hu et al. | |
| 2018/0351761 A1 | 12/2018 | Li et al. | |
| 2019/0014392 A1 | 1/2019 | Sullivan et al. | |
| 2019/0122050 A1* | 4/2019 | Beals | G08G 1/144 |

OTHER PUBLICATIONS

International Search Report and Written Opinion for PCT/US2019/063529 dated Feb. 21, 2020, all pages.
International Search Report and Written Opinion for PCT/US2019/063847 dated Feb. 25, 2020, all pages.
International Search Report and Written Opinion for PCT/US2018/052430 dated Jan. 15, 2019, all pages.
International Search Report and Written Opinion for PCT/US2019/044593 dated Oct. 23, 2019, all pages.
U.S. Appl. No. 62/713,346, filed Aug. 1, 2018 First Name Inventor: Richard Reisbick, all pages.

* cited by examiner

RADAR-AUGMENTATION OF PARKING SPACE SENSORS

CROSS REFERENCE TO RELATED APPLICATION

This application claims priority to U.S. Provisional Patent Application No. 62/773,596, filed on Nov. 30, 2018, entitled "Radar-Augmentation of Parking Space Sensors," the entire disclosure of which is hereby incorporated by reference for all purposes.

BACKGROUND

A parking sensor can be installed in a parking space to monitor whether a vehicle is parked within the parking space. However, if a large number of parking spaces are present, it may be prohibitively expensive and cumbersome to install a parking sensor in every parking space. Problems exist with other arrangements for monitoring the occupancy of parking spaces. For instance, a video camera may be easily obscured by obstacles and inclement weather.

SUMMARY

Various embodiments are described related to a system for monitoring occupancy of multiple parking spaces. In some embodiments, a system for monitoring occupancy of multiple parking spaces is described. The system may comprise a radar-based vehicle detector that may comprise a radar antenna that has a field-of-view of a portion of a parking facility. The portion of the parking facility may comprise a first set of parking spaces of the parking facility. The portion of the parking facility may exclude a second set of parking spaces of the parking facility. The system may comprise a plurality of parking space sensors. The plurality of parking space sensors may be installed in the second set of parking spaces. The system may comprise a parking host system that may communicate with the radar-based vehicle detector and the plurality of parking space sensors. The parking host system may be configured to analyze data received from the radar-based vehicle detector. The parking host system may be configured to analyze data received from the plurality of parking space sensors. The parking host system may be configured to output indications of parking spaces of the parking facility that may be occupied based on the analyzed data received from the radar-based vehicle detector and the data received from the plurality of parking space sensors.

Embodiments of such a system may include one or more of the following features: The system may comprise a camera. License plate recognition may be performed on images captured by the camera and a license plate number may be linked to a vehicle that enters the parking facility. The parking host system may be further configured to receive one or more images from the camera. The parking host system may be further configured to determine the license plate number of the vehicle from the one or more images. The parking host system may be further configured to link the license plate number with the vehicle. The parking host system may be further configured to track movement of the vehicle within the parking facility based on data from the radar-based vehicle detector. The parking host system may be further configured to determine the vehicle linked with the license plate number has parked in a parking space of the parking facility. An indication of the indications may indicate the parking space and the license plate number. The parking host system may be further configured to determine that detection of a vehicle may be obstructed by one or more obstacles within the parking facility. The parking host system may be further configured to, based on the data received from the radar-based vehicle detector and the data received from the plurality of parking space sensors, determine the vehicle may be parked within a parking space of the first set of parking spaces or the second set of parking spaces. The parking host system may be further configured to track movement of a vehicle within the parking facility based on data from the radar-based vehicle detector. The parking host system may be further configured to, after tracking movement, determine that detection of the vehicle may be obstructed by one or more obstacles with the parking facility. The parking host system may be further configured to determine that the vehicle has parked within a parking space in which a parking space sensor of the plurality of parking space sensors may be installed based on a location where the vehicle may have been last tracked and the parking space sensor indicating vehicle occupancy. The parking host system may further comprise a second radar-based parking space monitor that may be installed in a different location from the radar-based vehicle detector and has a second field-of-view that may overlap the field-of-view. The parking facility may be a parking garage. The parking host system may be part of a gateway device that may serve as an interface between a cloud-based server system and the plurality of parking space sensors. The system may further comprise an output display device that may indicate whether each parking space of the parking facility may be occupied based on the output indications.

In some embodiments, a method for determining where a vehicle has parked is described. The method may comprise tracking, using one or more radar-based vehicle detectors, the vehicle moving within a parking facility that may comprise a plurality of parking spaces. The method may comprise analyzing data obtained from one or more parking space sensor. Each parking space sensor of the one or more parking space sensors may be located within a parking space and monitors whether any vehicle may be present within only the parking space. The method may comprise determining a parking space in which the vehicle has parked based on tracking the vehicle using the one or more radar-based vehicle detectors and analyzing the data obtained from the one or more parking space sensors. The method may comprise outputting an indication that the parking space may be occupied.

Embodiments of such a method may include one or more of the following features: determining the parking space may comprise determining that the vehicle moving within the parking facility has left a field-of-view of the one or more radar-based vehicle detectors. Determining the parking space may comprise determining that a parking space sensor of the one or more parking space sensors that may be located outside the field-of-view of the one or more radar-based vehicle detectors may indicate that the parking space in which the parking space sensor is located may now be occupied. Determining the parking space may further comprise determining that the parking space sensor indicating that the parking space may now be occupied may be due to the vehicle based on less than a threshold amount of time elapsing from when the vehicle left the field-of-view of the one or more radar-based vehicle detectors and the parking space sensor indicating that the parking space may now be occupied. Determining the parking space may further comprise determining that the parking space sensor may be located in a region of the parking facility to which the vehicle had access based on where the vehicle left the field-of-view of the radar-based vehicle detector. The method may further comprise detecting the vehicle entering the parking facility. The method may further comprise determining a license plate number of the vehicle. The method may further comprise obtaining a map of the parking facility. The method may further comprise determining one or more locations for the one or more radar-based vehicle detectors that may decrease a number of parking space sensors needed to effectively monitor the plurality of parking spaces. Effectively monitoring the plurality of parking spaces may comprise accurately determining whether any vehicle is present within each parking space greater than a defined accuracy threshold. The method may further comprise performing a simulation to determine parking spaces of the plurality of parking spaces for which the one or more radar-based vehicle detectors may be insufficient to accurately determine whether any vehicle may be present within the parking spaces greater than the defined accuracy threshold.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A parking sensor installed in a parking space can be used to monitor whether a vehicle (e.g., car, truck, sport-utility vehicle, motorcycle, van, scooter, etc.) is parked within the parking space. Such a parking sensor may use a magnetometer and/or time-of-flight sensor to determine if a vehicle is in close proximity to the parking sensor. Such parking sensors may be highly accurate; however, it may be desirable to not have a parking sensor installed in every parking space, such as to save on installation costs, to decrease the amount of maintenance that needs to be performed at a parking facility, and/or to decrease the amount of batteries consumed by such a system. Further, other types of systems may be able to provide data that a parking sensor cannot.

One or more radar-based vehicle detection systems may be installed at a parking facility. A radar-based vehicle detection system may monitor whether a vehicle is parking in a parking space and track movement of a vehicle through a parking facility. The radar-based vehicle detection system may monitor multiple parking spaces; thus, the radar-based vehicle detection system can replace multiple parking sensors. Depending on where the radar-based vehicle detection system is installed, it may be possible for the field-of-view of the radar-based vehicle detection system to be obscured from viewing various parking spaces and from determining if a vehicle is present in the parking spaces. For instance, the shape of a parking facility may result in pillars and walls that prevent the radar-based vehicle detection system from viewing certain parking spaces. Further, a vehicle parked in a parking space may block a field-of-view of another parking space. Therefore, a radar-based vehicle detection system may be used in conjunction with parking sensors to monitor parking at a parking facility. Additionally, in some embodiments, a visible-light camera system may be used to augment the radar-based vehicle detection system. A camera system may be used to read license plate numbers of vehicles entering and/or exiting a parking facility. The camera system may be used to identify a vehicle entering a parking facility, the radar-based vehicle detection system may be used to track the vehicle as it moves through the parking facility, and the radar-based vehicle detection system possibly in conjunction with a parking sensor may be used to determine the parking space in which a vehicle has parked. Such an arrangement may involve fewer parking sensors than if only parking sensors were used to monitor the parking facility.

Figure 1:
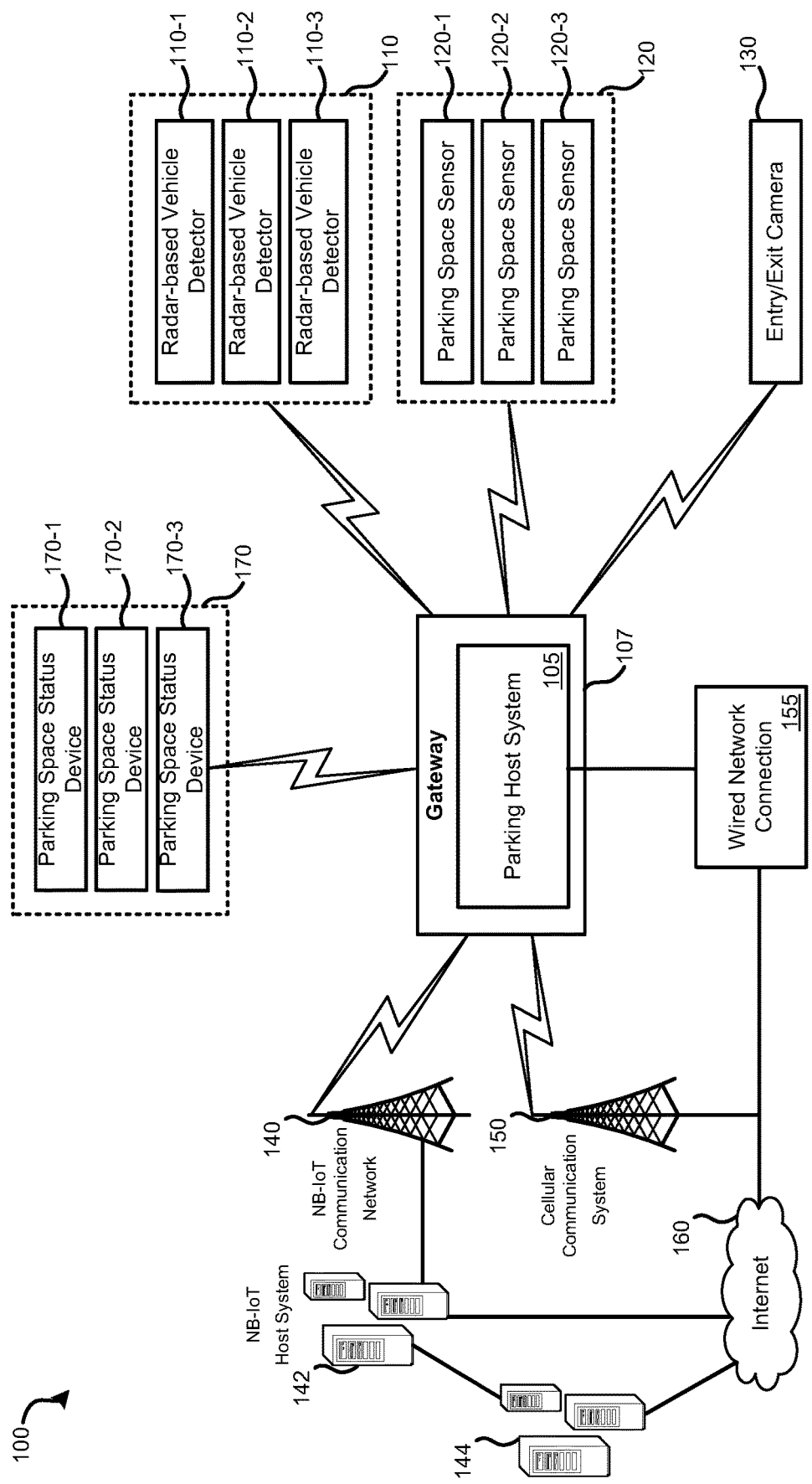
FIG. 1 illustrates a block diagram of a parking monitoring system.

Detail of these and additional embodiments are provided in reference to the figures. FIG. 1 illustrates a block diagram of a parking monitoring system 100. Parking monitoring system 100 may be used for monitoring the utilization of parking spaces at a parking facility. A parking facility may be a parking garage, parking lot, on-street parking, or some other area or structure where vehicles may be stored. Parking monitoring system 100 may include: parking host system 105; gateway device 107; radar-based vehicle detectors 110 (which include radar-based vehicle detectors 110-1, 110-2, and 110-3); parking space sensors 120 (which include parking spaces sensors 120-1, 120-2, and 120-3); entry/exit camera 130; parking space status devices 170 (which can include parking space status devices 170-1, 170-2, and 170-3); narrowband Internet of Things (NB-IoT) network 140; NB-IoT host system 142; cloud-based server system 144; cellular communication system 150; wired network connection 155; and the Internet 160.

Parking host system 105 may receive data from radar-based vehicle detectors 110, parking space sensors 120, and/or entry/exit camera 130. Parking host system 105 may use the data obtained from these devices to determine a number of vehicles present within a parking facility and/or the specific parking spaces in which vehicles are parked within the parking facility. Parking host system 105 may output indications of the number of vehicles parked at a parking facility, the specific occupied parking spaces, identifiers of vehicles parked in those specific parking spaces, and/or the number and/or identifiers of vehicles moving within the parking facility. Such data may be transmitted to parking space status devices 170, which may output an indication of whether a parking space is occupied or empty and/or the number of parking spaces available or occupied at the parking facility. Parking host system 105 may also transmit data received from a cloud-based server system 144. Parking host system 105 may communicate with cloud-based server system 144 via various wired and/or wireless communication arrangements.

In some embodiments, parking host system 105 is incorporated as part of gateway device 107. Gateway device 107 may serve as a gateway between sensor devices that communicate using a local wireless communication protocol and a remote cloud-based server system that requires long-distance communication. Further detail regarding an embodiment of gateway device 107 is provided in U.S. Pat. App. No. 62/773,504, entitled "Host-Neutral Gateway Processing System,", filed on Nov. 30, 2018, the entire disclosure of which is hereby incorporated by reference for all purposes. In such an embodiment, gateway device 107 may execute an operator-specific application performs the functions of parking host system 105. In other embodiments, parking host system 105 may be a standalone device that includes various computerized components, such as special-purpose processors, general-purpose processors, and a non-transitory processor-readable medium. Further detail regarding parking host system 105 is provided in relation to FIG. 2.

Gateway device 107, or parking host system 105, may be able to communicate via one or more communication methods with remote networks and host systems. In the illustrated embodiment, gateway device 107 can communicate with NB-IoT communication network 140. NB-IoT network 140 may permit low-bandwidth communication over a relatively large distance from a single communication tower. For instance, an NB-IoT network may allow for 250 kilobits per second over a single narrow-band, such as 200 kHz. NB-IoT communication network 140 may communicate with NB-IoT host system 142. NB-IoT host system 142 may provide for additional processing capabilities on data obtained from sensor devices and wireless devices that communicate with gateway device 107 or parking host system 105. Additionally or alternatively, NB-IoT host system 142 may serve as an interface between NB-IoT network 140 and the Internet 160. In some embodiments, a cloud-based server system 144 may be connected with NB-IoT host system 142 via a communication arrangement other than the Internet, such as a private local area network (LAN). Cloud-based server system 144 may be operated by a particular operator and may receive and process data from a particular group of associated sensors or wireless devices.

Gateway device 107, or parking host system 105, may additionally or alternatively be able to communicate with Internet 160 via cellular communication system 150. Gateway device 107 may use a 3G, LTE, 4G, 5G, 6G, or some other form of cellular network to access the Internet 160. In some embodiments, such a communication arrangement may be significantly higher bandwidth than NB-IoT network 140, but may be more expensive to access. Additionally or alternatively, gateway device 107 may have a wired network connection 155, such as via an Ethernet, to communicate with Internet 160. Alternatively or additionally, other forms of communication to access the Internet 160 are possible. For example, in some embodiments, gateway device 107 or parking host system 105 may use a Wi-Fi connection to access Internet 160 or a wide-area wireless network.

A radar-based vehicle detector of radar-based vehicle detectors 110 may include a transmitter, a receiver, an antenna, and a processing system. The antenna of each radar-based vehicle detector may have a field-of-view of a portion of a parking facility. Each radar-based vehicle detector 110 may be installed in a different location in or around a parking facility such that the fields-of-view of each radar antenna are different (e.g., partially overlaps). In some embodiments, radar-based vehicle detectors capture radar images of a field-of-view of the parking facility and provide such images to parking host system 105 for analysis. In other embodiments, processing may be performed locally by each radar-based vehicle detector and a determination may be made locally as to whether a parking space is occupied by a vehicle.

In some embodiments, radar-based vehicle detectors 110 may emit electromagnetic (EM) radiation around 24 GHz. Reflected EM radiation around 24 GHz may be sufficient to detect whether a vehicle is present in a particular location and to track a vehicle through the parking facility as it moves. In some embodiments, radar-based vehicle detectors 110 may emit electromagnetic (EM) radiation around 75 GHz. Reflected EM radiation around 75 GHz may be used to determine greater detail about a parking facility and vehicles within the parking facility. For example, it may be possible to determine specific details of a vehicle using 75 GHz, such as a license plate number or identifying characteristics of the vehicle.

In some embodiments, additionally or alternatively to using radar-based vehicle detectors, visible light-based cameras may be used. In some situations, visible light cameras may be less effective due to visible light being affected by rain, fog and snow. Radar at certain frequencies may exhibit less reflectivity to such precipitation. However, for some parking facilities, such as an indoor garage, visible light-based cameras may function well.

Parking space sensors 120 may each be installed within a parking space to determine whether a vehicle is present within the parking space. Detail regarding the location and physical exterior design of a possible embodiment of parking sensor device 100-1 is provided in U.S. patent application Ser. No. 15/286,429, filed Oct. 5, 2016, entitled "Parking Data Aggregation and Distribution," the entire disclosure of which is hereby incorporated by reference for all purposes. Each parking space sensor may have a magnetometer on-board to measure a magnetic field that is affected by whether a vehicle is present. Parking space sensors 120 may transmit data indicative of measured magnetic fields to parking host system 105, which may analyze the received data to determine if a vehicle is present. In other embodiments, each parking space sensor 120 may make a determination as to whether a vehicle is present and provide an indication of such to parking host system 105. Further detail regarding the functioning of a parking space sensor 120 is provided in U.S. Provisional App. No. 62/713,346, entitled "Parking Sensor Magnetometer Calibration," the entire disclosure of which is hereby incorporated for all purposes.

Entry/exit camera 130 may capture visible light images of vehicles entering and/or exiting the parking facility. Entry/exit camera 130 may be designed and positioned to capture specific details of the vehicle, such as a vehicle license plate number. In some embodiments, entry/exit camera 130 may capture an image of a license plate, which is then analyzed by parking host system 105 to determine the license plate number. In some embodiments, additional details about the vehicle are captured by entry/exit camera 130, such as size and color. Images captured by entry/exit camera 130 may be matched with a vehicle detected by a radar-based vehicle detector that has an overlapping field-of-view with entry/exit camera 130. The vehicle may then be tracked through the parking facility using radar-based vehicle detectors 110 and may be linked with the license plate number (or other form of vehicle identifier) determined using entry/exit camera 130.

Parking space status devices 170 may be used to identify whether a parking space is occupied or empty. In some embodiments, a parking space status device is installed proximate to a parking space, such as attached to a ceiling in front of the parking space, and is illuminated based on the parking space's status of occupied or empty. For instance, a parking space status device may illuminate green if the parking space is available or may illuminate red if the parking space is filled. In some embodiments, a parking space status of parking space status devices 170 may be a display that indicates a number of parking spaces available within the parking facility or in a specific portion of the parking facility (e.g., a level or floor). For instance, parking space status device 170 may indicate that a vehicle should proceed to the $3^{rd}$ level due to a number of open parking spaces being present there.

In parking monitoring system 100, three parking space status devices 170, three radar-based vehicle detectors 110, three parking space sensors 120, and one entry/exit camera 130 are illustrated. The numbers of devices are for example purposes on. Greater or fewer numbers of each type of device may be present in other embodiments. For example, in a parking facility with hundreds of parking spaces, hundreds of parking space sensors 120 may be present.

Figure 2:
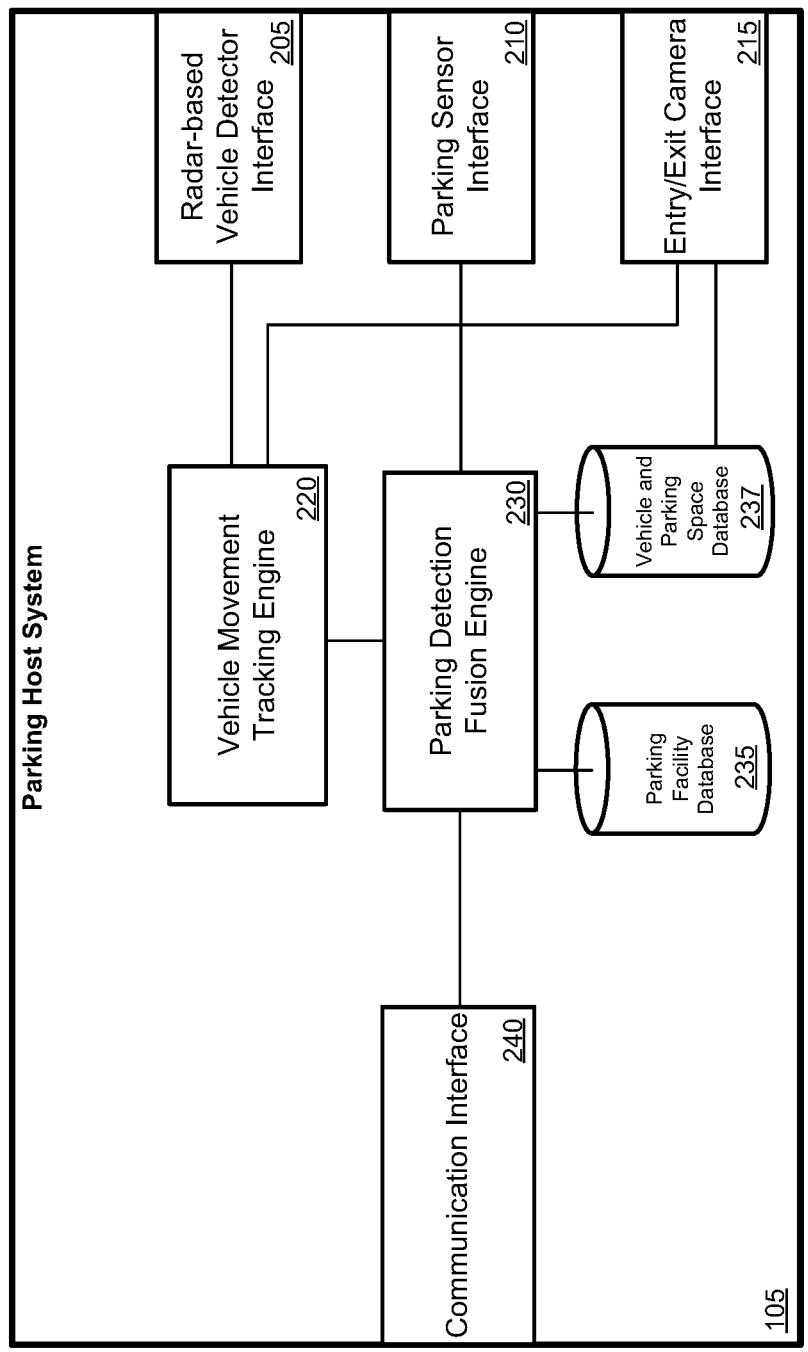
FIG. 2 illustrates a block diagram of a parking host system.

FIG. 2 illustrates a block diagram of a parking host system 105. Parking host system 105 may include: radar-based vehicle detector interface 205; parking sensor interface 210; entry/exit camera interface 215; vehicle movement tracking engine 220; parking detection fusion engine 230; parking facility map 235; vehicle and parking space database 237; and communication interface 240.

Radar-based vehicle detector interface 205 may serve to receive data from various radar-based vehicle detectors from within or around a parking facility. In some embodiments, radar-based vehicle detector interface 205 may receive raw data from radar-based vehicle detectors and may analyze such data to determine the location of occupied parking spaces and/or vehicles moving within the parking facility. In other embodiments, radar-based vehicle detector interface 205 may receive process data that indicates occupied and unoccupied parking spaces and the movement of one or more vehicles within the parking facility.

Parking sensor interface 210 may receive raw measurement data from parking sensors positioned in parking spaces within the parking facility and may analyze such measurement data to determine which parking sensors are located in occupied parking spaces. In other embodiments, parking sensor interface 210 may receive indications of which parking spaces are occupied and which parking spaces are empty within the parking facility from the parking sensors. Therefore, in some embodiments, measurements made by a parking sensor are analyzed by the parking sensor itself, while in other embodiments, the measurements are analyzed by parking sensor interface 210.

Entry/exit camera interface 215 may receive raw images from an entry/exit camera and may analyze such images to determine an identifier of a vehicle (e.g., license plate number), characteristics of the vehicle, etc. In other embodiments, the entry/exit camera itself may perform analysis of captured images and provide indications of a vehicle identifier and/or characteristics of the vehicle to entry/exit camera interface 215.

Vehicle movement tracking engine 220 may use data received from radar-based vehicle detector interface 205 and entry/exit camera interface 215 to track a vehicle moving through the parking facility. Data captured using entry/exit camera interface 215 may be used to identify characteristics of the vehicle, including a license plate number or other form of vehicle identifier. Radar data from radar-based vehicle detector interface 205 may be used to track the vehicle as it moves through the parking facility. By tracking the vehicle from when the entry/exit camera imaged the vehicle, the vehicle identifier and vehicle characteristics can be maintained linked to the vehicle.

Vehicle movement tracking engine 220 may be used to continue tracking the vehicle when the vehicle is out of the field-of-view of each radar-based vehicle detector. For instance, when a vehicle leaves the field-of-view of a particular radar-based vehicle detector, it can be extrapolated that the vehicle is within a particular region of the parking facility. The vehicle can be assumed to remain within that particular region until the vehicle is again detected by a radar-based vehicle detector either leaving the particular region of the parking facility or entering another region of the parking facility. Further detail regarding such movement tracking is provided in relation to FIG. 5.

Parking detection fusion engine 230 may receive parking data from parking sensor interface 210 and vehicle movement tracking engine 220. Data obtained from vehicle movement tracking engine 220 may represent a combination of data from radar-based vehicle detectors and one or more entry/exit cameras. Therefore, parking detection fusion engine 230 may use a combination of data from radar-based vehicle detector interface 205, parking sensor interface 210, and entry/exit camera interface 215 to determine which parking spaces within a parking facility are occupied or unoccupied. Parking detection fusion engine 230 may determine that a parking space is occupied if: the parking space has a parking sensor and the parking sensor provides data to parking sensor interface 210 indicating that a vehicle is present within the parking space. Parking detection fusion engine 230 may also determine that a parking space is occupied if: a radar-based vehicle detector has a clear view of a parking space and determines that a vehicle is parked within the parking space. Parking detection fusion engine 230 may determine that one or a group of parking spaces is occupied or partially occupied even if no parking sensors are installed in those parking spaces and a radar-based vehicle detector does not have a clear view of the parking spaces based on tracking the location of one or more vehicles entering the vicinity of the parking spaces and the vehicles not having left the vicinity of the parking spaces or having entered a parking space that does have a parking sensor. Further detail regarding such an embodiment is provided in relation to FIG. 5.

Parking facility database 235 may be a locally stored data arrangement on a non-transitory processor-readable medium that defines portions of the parking facility that are monitored using radar-based vehicle detectors, portions of the parking facility that are monitored using parking sensors, portions of the parking facility that are monitored using both or neither of radar-based vehicle detectors and parking sensors, and locations and identifiers of individual parking spaces. Vehicle and parking space database 237 may be stored to a non-transitory processor-readable medium and may be used to store identifiers of vehicles and/or characteristics of vehicles in combination with the current location of the vehicle. For example, a vehicle identifier may be stored as mapped with an identifier of a parking space in which the vehicle is currently parked. A vehicle identifier may be mapped with a region of a parking facility if the exact parking space cannot be determined. If a vehicle is moving within the parking facility, the vehicle identifier may be stored in conjunction with a last determined location of the vehicle, such as in the form of coordinates.

Communication interface 240 may allow parking host system 105 to output indications of which parking spaces are occupied and/or a number of parking spaces at a parking facility that are occupied. Additionally, communication interface 240 may receive communications from one or more remote cloud-based server system. Such communications may, for example, query parking host system 105 and/or may provide software or firmware updates.

Parking host system 105 may include one or more special-purpose or general-purpose processors, such as to perform the tasks of vehicle movement tracking engine 220 and parking detection fusion engine 230. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Figure 3:
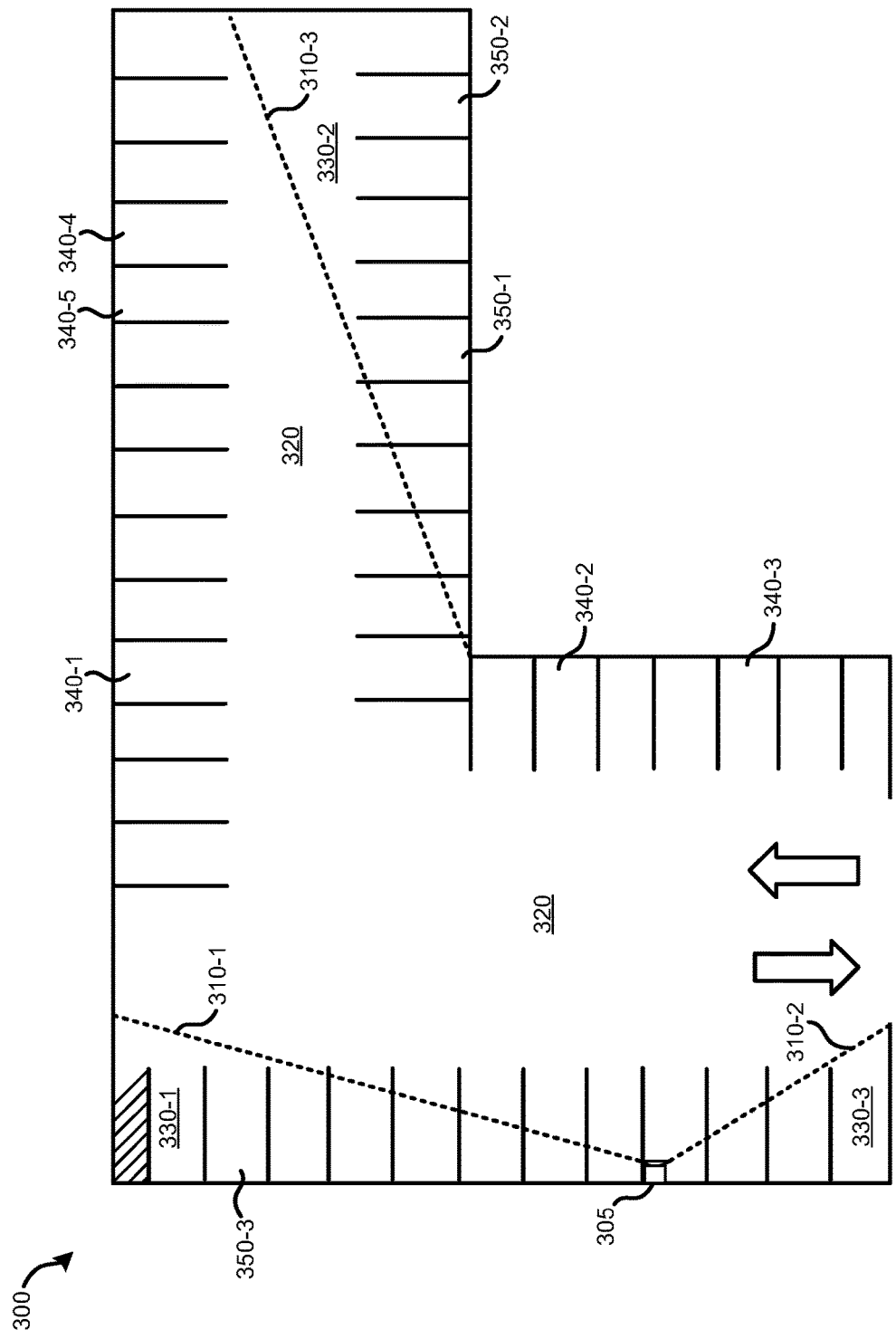
FIG. 3 illustrates a top view of a parking facility at which a single radar device monitors multiple parking spaces.

FIG. 3 illustrates a top view of an embodiment 300 of a parking facility at which a single radar device 305 monitors multiple parking spaces. A parking host system may be located relatively nearby and may communicate with radar-based vehicle detector 305 via wireless or wired communication. In embodiment 300, radar-based vehicle detector 305 has field-of-view 320. Field-of-view 320 is defined by field-of-view boundaries 310 (310-1, 310-2, and 310-3). Field-of-view limit 310-3 is caused by a wall obstructing a portion of the parking facility from being monitored by radar-based vehicle detector 305. Hidden regions 330 (330-1, 330-2, 330-3) indicate portions of the parking facility outside of field-of-view 320 of radar-based vehicle detector 305.

Parking spaces 340-1, 340-2, and 340-3, for example, may be monitored by radar-based vehicle detector 305. However, parking spaces 350-1, 350-2 and 350-3, for example, may not be monitored by radar-based vehicle detector 305. Some parking spaces, such as parking space 340-4 may be within field-of-view 320. However, parking space 340-4, for example, may be obstructed if a large vehicle parks in parking space 340-5.

Figure 4:
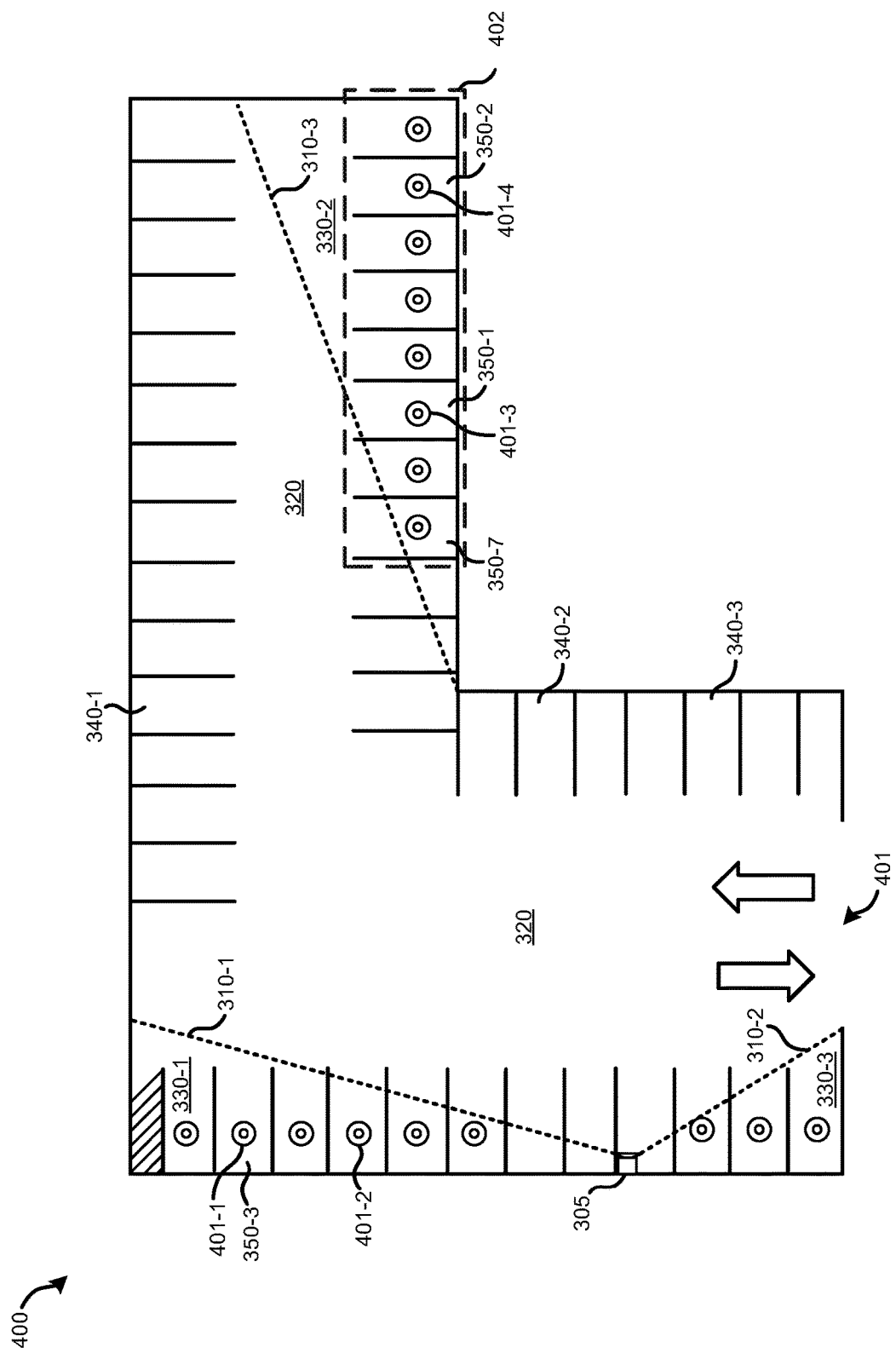
FIG. 4 illustrates a top view of a parking facility at which a radar device monitors multiple parking spaces in conjunction with multiple parking space sensors.

FIG. 4 illustrates a top view of another embodiment 400 of the parking facility in FIG. 3. In this embodiment, a radar device monitors multiple parking spaces in conjunction with multiple parking space sensors. In this embodiment, parking spaces that fall outside of field-of-view 320 and are within hidden regions 330 may be monitored using parking sensors. For instance, within parking space 350-3, parking sensor 401-1 may be installed; within parking space 350-1, parking sensor 401-3 may be installed, within parking space 350-2, parking sensor 401-4 may be installed. Parking space 350-7 may be partially within field-of-view 320 with a significant portion (e.g., greater than 50%) falling within hidden regions 330, therefore a parking sensor may be installed.

When a vehicle travels through field-of-view 320 and crosses field-of-view boundary 310-3 and enters hidden region 330-2, the parking host system may still be able to determine the specific vehicle that parked within a parking space. For instance, an entry/exit camera may capture a vehicle identifier of a vehicle entering the parking facility through entrance/exit 401. Radar-based vehicle detector 305 may monitor the progress of a vehicle through field-of-view 320. If the vehicle leaves field-of-view 320 through field-of-view boundary 310-3 and, within a defined threshold period of time, a parking sensor in region 402 indicates that a vehicle has arrived and parked within the parking space, the parking host system's parking fusion engine may determine that the vehicle that triggered the parking sensor is highly likely to be the vehicle that recently traversed field-of-view boundary 310-3. Therefore, the parking host may store an indication of the vehicle (e.g., license plate number) in association with an identifier of the parking space sensor or the parking space in which the vehicle has been determined to be parked.

If multiple vehicles are monitored entering hidden region 330-2, a "first-in, first parked" method of determining which vehicle is parked in which parking space may be used. For example, if a first vehicle is followed by a second vehicle crossing into hidden region 330-2 through field-of-view boundary 310-1, the first parking sensor that indicates a vehicle arrival may be assumed to be the first vehicle. Such an arrangement may not be perfectly accurate since, for example, the second vehicle may turn into parking space 350-1 prior to the first vehicle turning into parking space 350-2.

Figure 5:
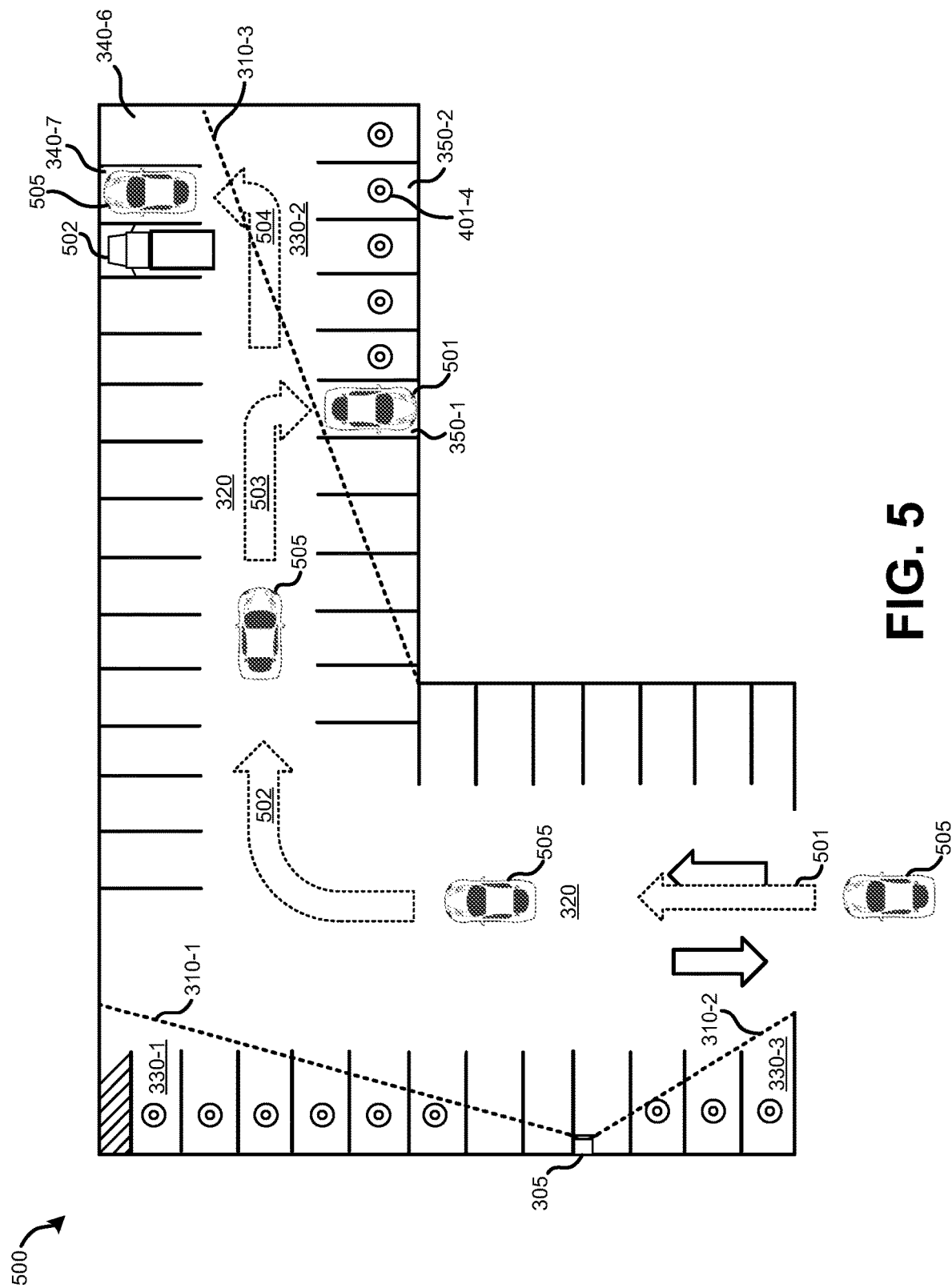
FIG. 5 illustrates a time lapse of a top view of a parking facility as a vehicle enters and parks within the parking facility.

FIG. 5 illustrates a time lapse of a top view of an embodiment of a parking facility as a vehicle enters and parks within the parking facility. In embodiment 500, vehicle 505 enters the parking facility as indicated by movement arrow 501. As vehicle 505 moves (such as indicated by movement arrow 502) through field-of-view 320, radar-based vehicle detector 305 may monitor its movement. Vehicle 505 may turn and drive toward field-of-view boundary 310-3.

In a first arrangement of embodiment 500, a parking sensor is present in parking space 350-1. While vehicle 505 may leave field-of-view 320 through field-of-view boundary 310-1, the parking host system may still determine that vehicle 505 has parked in parking space 350-1 (following movement arrow 503) by analyzing: when a parking sensor within parking space 350-1 detected the arrival of a vehicle; when vehicle 505 crossed from field-of-view 320 into hidden region 330-2; and/or where vehicle 505 crossed field-of-view boundary 310-3. For example, if the parking sensor in parking space 350-1 detects a vehicle arriving at parking space 350-1 within a predetermined amount of time, such as ten seconds, of vehicle 505 crossing field-of-view boundary 310-3 (and no other parking sensors detected a vehicle arrival between when vehicle 505 crossed field-of-view boundary 310-3 and the detection by the parking sensor in parking space 350-1), the parking host system may determine that vehicle 505 is the vehicle that parked within parking space 350-1. However, if vehicle 505 instead crossed field-of-view boundary 310-1 into hidden region 330-1, the parking host system may not link a parking sensor in parking space 350-1 to vehicle 505 since field-of-view boundary 310-1 is not proximate to parking space 350-1 and it would be highly unlikely vehicle 505 triggered the parking sensor.

In a second arrangement of embodiment 500, parking space 350-1 does not have a parking sensor installed. When vehicle 505 crosses field-of-view boundary 310-3, remains outside of field-of-view 320 for a defined period of time (e.g., thirty seconds), and a parking sensor in parking facility region 402 does not indicate the arrival of vehicle 505, vehicle 505 may be determined to have parked in a parking space that is hidden or obscured from radar-based vehicle detector 305 but does not have a parking sensor. Therefore, vehicle 505 may have followed movement arrow 503 and parked in hidden parking space 350-1. Alternatively, vehicle 505 may have followed movement arrow 504 and parked in obscured parking space 340-7 and is at least partially obscured by vehicle 505 from detection by radar-based vehicle detector 305. In such a situation, it may not be possible to determine the precise parking space in which vehicle 505 parked. For example, vehicle 505 may have parked in parking space 340-6 and still be obscured from radar-based vehicle detector 305 by vehicle 505. In some embodiments, data collected by radar-based vehicle detector 305 may be used to make an estimation of where vehicle 505 parked based on the last location of vehicle 505 within field-of-view 320. For instance, vehicle 505 may be partially visible while pulling into parking space 340-7 and 340-6. This view of vehicle 505 by radar-based vehicle detector 305 may be sufficient for radar-based vehicle detector 305 to determine that vehicle 505 is in parking space 340-7 or 340-6. Similarly, based on where vehicle 505 exited field-of-view 320, data from radar-based vehicle detector 305 may be used to estimate that vehicle 505 entered parking space 350-1.

Figure 6:
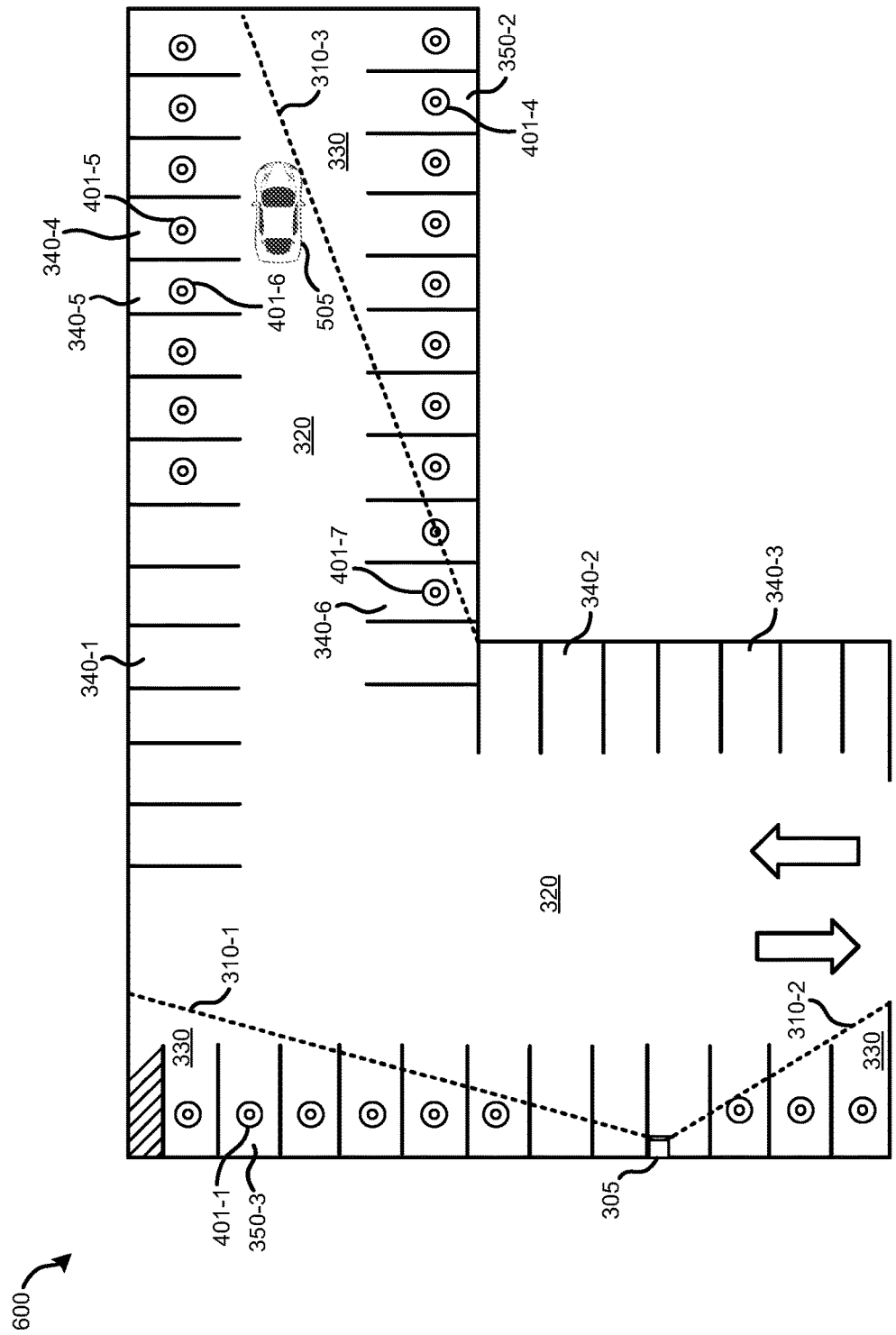
FIG. 6 illustrates a top view of a parking facility at which a radar device monitors multiple parking spaces in conjunction with an expanded number of parking space sensors.

FIG. 6 illustrates a top view of an embodiment of a parking facility at which a radar device monitors multiple parking spaces in conjunction with an expanded number of parking space sensors. In embodiment 600, parking sensors are installed in parking spaces that are within field-of-view 320 of radar-based vehicle detector 305 but which may be significantly obscured by a vehicle parked in an adjacent or nearby parking space. In parking space 340-5, parking sensor 401-6 is installed; in parking space 340-4, parking sensor 401-5 is installed. Additionally, parking sensors are installed in hidden regions 330 of the parking facility, including parking sensor 401-1 in parking space 350-3. Parking space 340-4 may have a parking sensor installed since a vehicle parking in parking space 340-5 may significantly obscure a view of parking space 340-4. However, a parking sensor in parking space 340-2 may remain unnecessary since the view of radar-based vehicle detector 305 will not be obscured by a vehicle parked in an adjacent or nearby parking space.

In embodiment 600, when a vehicle enters a hidden, obscured, or partially hidden or obscured parking space, a parking detection fusion engine being executed by the parking host system may analyze radar-based vehicle detector data in conjunction with parking sensor data. When a location cannot be determined from radar-based vehicle detector data, parking sensor data may be monitored for a parking sensor that indicates a vehicle arrival within a threshold amount of time in the vicinity of the last determined location of the vehicle. For example, if vehicle 505 was last detected by radar-based vehicle detector 305 at the illustrated location and, within a threshold period of time (e.g., 15 seconds), parking sensor 401-4 indicates a vehicle arrival, the parking detection fusion engine may determine that vehicle 505 has parked in parking space 350-2.

Figure 7:
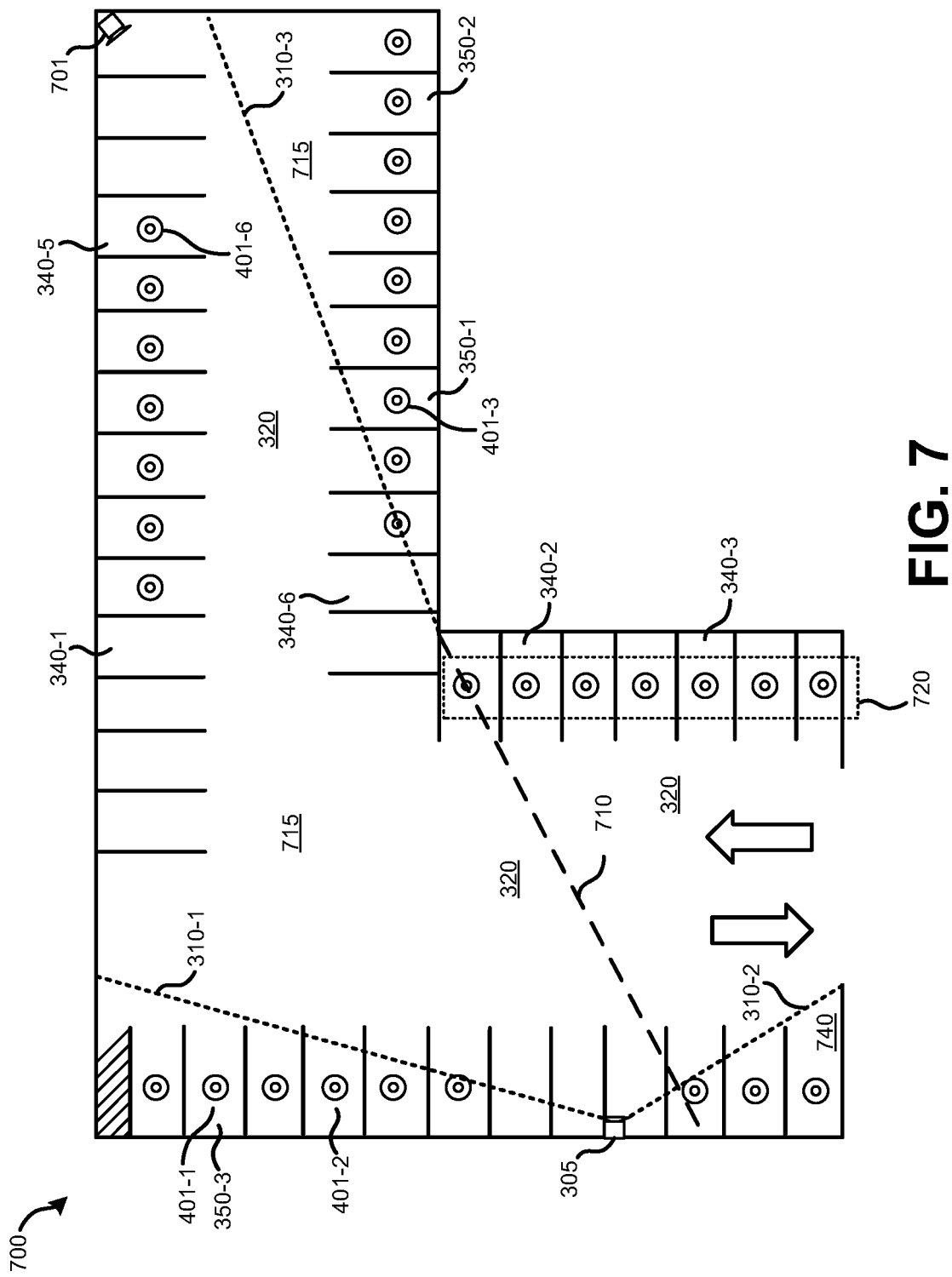
FIG. 7 illustrates a top view of a parking facility at which multiple radar devices monitor multiple parking spaces in conjunction with multiple parking space sensors.

FIG. 7 illustrates a top view of an embodiment 700 of a parking facility at which multiple radar devices monitor multiple parking spaces in conjunction with multiple parking space sensors. In addition to radar-based vehicle detector 305 having field-of-view 320 defined by field-of-view boundaries 310 being present, radar-based vehicle detector 701 is present having field-of-view boundary 710 defining field-of-view 715. Therefore, portions of field-of-view 320 overlap with field-of-view 715.

By using multiple radar-based vehicle detectors, the number of parking spaces that are either hidden or capable of being obscured from both radar-based vehicle detectors is decreased. For example, in embodiment 700, only region 740 remains hidden to both radar-based vehicle detectors 305 and 701. In embodiment 700, parking sensors are positioned in parking spaces that: 1) are only within the field-of-view of a single radar-based vehicle detector; or 2) are in a location where the parking space may be obscured from both radar-based vehicle detectors by adjacent vehicles. For instance, parking sensors are installed in parking spaces in region 720 because these parking spaces fall outside of field-of-view 715. In such an embodiment, although a vehicle may be obscured from radar-based vehicle detector 305, the vehicle may remain visible and trackable via radar-based vehicle detector 701.

Figure 8:
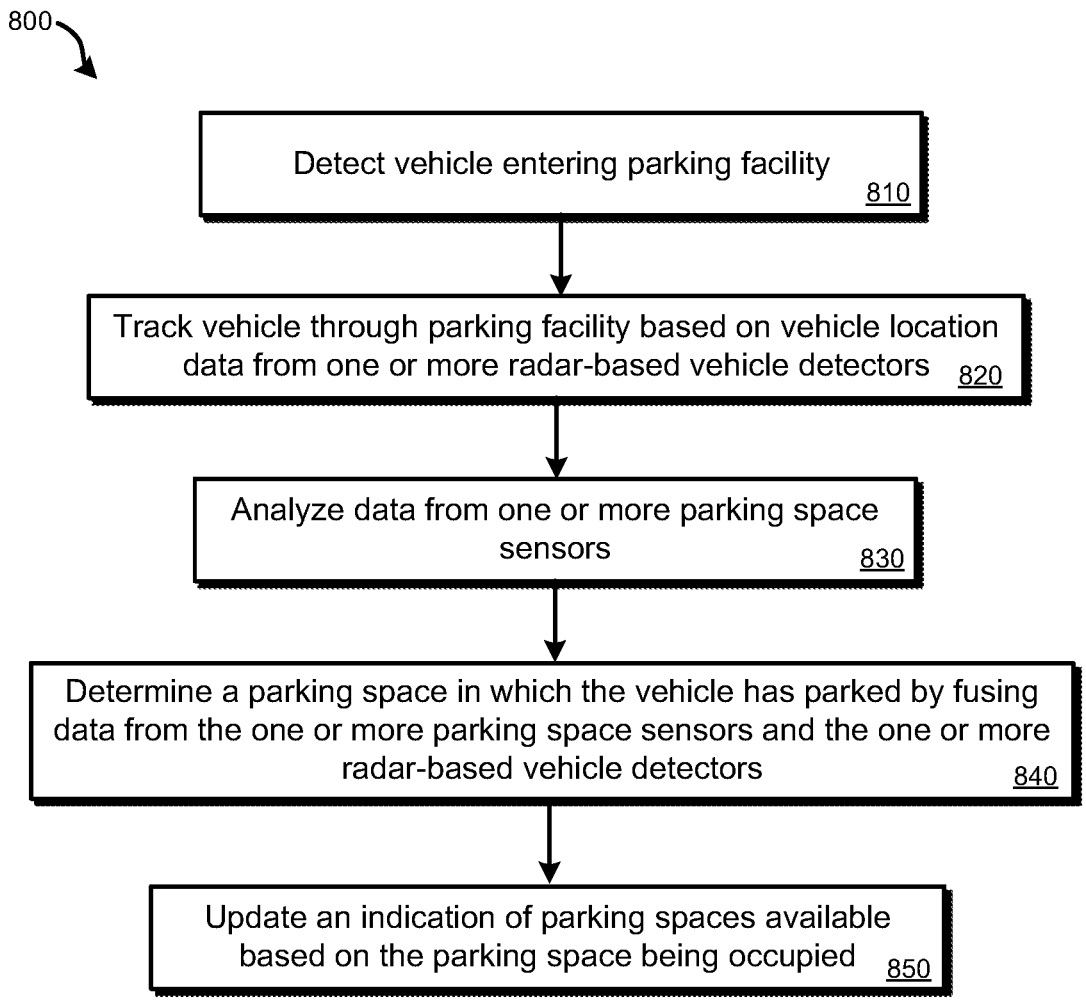
FIG. 8 illustrates an embodiment of a method for using a radar device and parking space sensors to determine where a vehicle has parked.

Various methods may be performed using the systems and arrangements detailed in relation to FIGS. 1-7. FIG. 8 illustrates an embodiment of a method 800 for using a radar device and parking space sensors to determine where a vehicle has parked. Method 800 may be performed using parking monitoring system 100 or any of the systems detailed in relation to FIGS. 2-7. Each step of method 800 may be performed by parking host system 105 or some other form of parking host system.

At block 810, a vehicle may be detected entering a parking facility. The vehicle may be initially detected using one or more visible light cameras that provides data or images to the parking host system. The images may be used by the parking host system (or some other component or system) to read a vehicle identifier (e.g., license plate) of the vehicle and/or determine one or more characteristics of the vehicle, such as color, size, type, make, model, etc. The vehicle identifier may be stored and linked with the vehicle as the vehicle is monitored and tracked within the parking facility.

At block 820, the location of the vehicle within the parking facility may be tracked using data from one or more radar-based vehicle detectors. Each radar-based vehicle detector may have a field-of-view. These fields-of-view may at least partially overlap. Tracking the location of the vehicle may include determining where the vehicle is currently located and/or a parking space in which the vehicle has parked.

At block 830, data from one or more parking sensors may be analyzed. The data from the parking sensors may indicate whether or not a parking space is occupied by a vehicle. In other embodiments, the data from the one or more parking sensors may be raw magnetic measurements that are analyzed by the parking host system to determine whether or not a vehicle is present.

At block 840, the parking host system may analyze the data from the one or more radar-based vehicle detectors and the data from the one or more parking sensors to determine a parking space in which the vehicle has parked. The parking sensor data may be analyzed in conjunction with data obtained from the radar-based vehicle detectors to determine if a particular vehicle is likely the same vehicle that has entered a parking space. For example, if the parking host system determines that the vehicle enters a parking space and, within a defined threshold period of time, a parking sensor within the parking space indicates that the parking space is occupied, the parking host system can with a high confidence determine that the vehicle parked within the parking space.

Alternatively, at block 840, if the data from the one or more radar-based vehicle detectors indicates that the vehicle has departed a field-of-view of a radar-based vehicle detector, but a parking sensor in the region near where the vehicle has departed the field-of-view indicates that a vehicle is now present, an inference may be made by the parking host system that the vehicle identified at block 810 is the vehicle that parked in the parking space. In some embodiments, the determination may only be made if less than a threshold amount of time has elapsed between when the vehicle left the field-of-view and when the parking space sensor indicates that the parking space is occupied. Further, the inference may only be made if the parking space sensor is located in a location that would be reasonable for the vehicle to have entered after the vehicle left the field-of-view.

Alternatively, at block 840, if the data from the one or more radar-based vehicle detectors indicates that the vehicle has departed a field-of-view of a radar-based vehicle detector, and no parking sensors in the region to where the vehicle has departed indicate a vehicle has parked, an inference may be made by the parking host system that the vehicle identified at block 810 has parked in a parking space hidden from the radar-based vehicle detector.

At block 850, an indication of which parking spaces are available may be updated based on the determination of block 840. This may include a display that presents an overall count of the parking spaces available in various regions of the parking facility being updated. The update may also include an indicator specific to the parking space in which the vehicle parked being updated to indicate that the parking space is now filled. Entry to the parking facility can be controlled based on a number of available parking spaces. Further, data may be stored indicative of the vehicle identifier being linked with the parking space in which the vehicle is parked. The indication of the parking space in which the vehicle is parked, along with the vehicle identifier, may be transmitted to a cloud-based server system.

Figure 9:
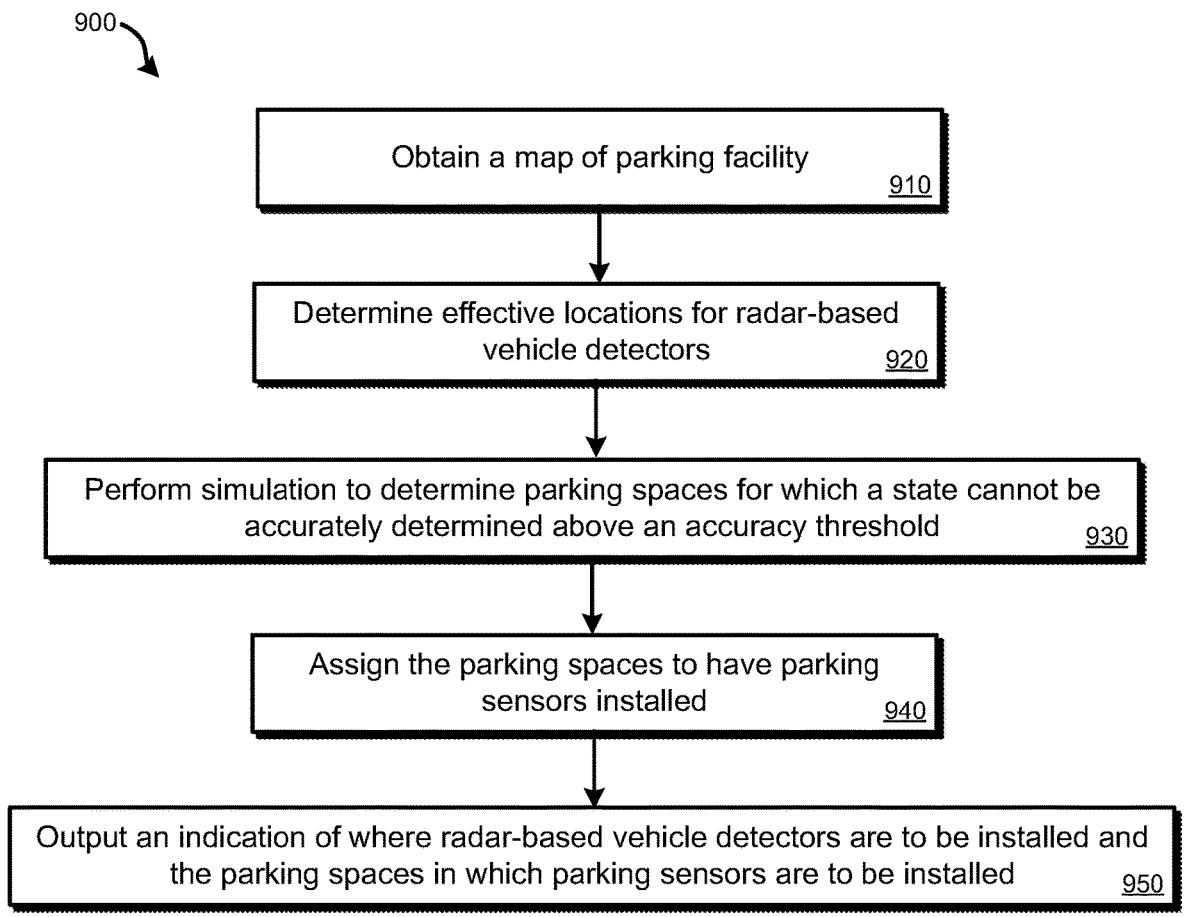
FIG. 9 illustrates an embodiment of a method for determining an efficient arrangement for monitoring parking spaces within a parking facility.

FIG. 9 illustrates an embodiment of a method 900 for determining an efficient arrangement for monitoring parking spaces within a parking facility. Prior to method 800 being performed, method 900 may be performed to determine where radar-based vehicle detectors should be positioned at a parking facility and which parking spaces should be monitored using in-space parking sensors. Method 900 may be performed using parking monitoring system 100 and parking host system 105 of FIGS. 1 and 2. Each step of method 800 may be performed by parking host system 105 or some other form of parking host system.

At block 910, a map or rendering of a parking facility may be obtained. The map or rendering may include the layout of the parking facility and the specific location of each parking space. The map or rendering can indicate where pillars or obstructions are located, where the entrance and exit is located, the height of any ceiling present, and/or other physical properties of the parking facility. Additional details may be added by a user, such as locations where it is permissible to mount cameras or radar-based vehicle detectors.

At block 920, effective locations for radar-based vehicle detectors may be determined. The locations determined at block 920 may indicate where radar-based vehicle detectors should be located in order to monitor the greatest number of parking spaces within the parking facility. The locations may be restricted to only being located within regions where it is permissible to mount cameras or radar-based vehicle detectors. In some embodiments, a number of radar-based vehicle detectors is input as a precondition for selecting the locations. In other embodiments, different results are output that correspond to different numbers of radar-based vehicle detectors. Such an arrangement can help an administrator decide if installation of additional radar-based vehicle detectors is worth the expense, perhaps to save on installation of individual parking space sensors.

At block 930, various simulations may be performed to determine parking spaces within the parking facility that cannot be accurately monitored for whether a vehicle is present. A defined accuracy threshold may be provided, such as 99% or 99.5%. Therefore, for various sorts of situations, such as where many large vehicles are present within the parking facility and potentially obstructing the views of particular parking spaces, a determination is made as to which parking spaces can and cannot be monitored with at least the defined accuracy threshold.

At block 940, for parking spaces that cannot be monitored with exclusively the radar-base vehicle detectors with at least the defined accuracy threshold, a parking sensor may be assigned for installation. In some embodiments, blocks 920-940 may be repeated many times as part of different simulations in an attempt to minimize the number of parking sensors needed such that every parking space is monitored with at least the defined accuracy threshold.

At block 950, an indication may be output of where the radar-based vehicle detectors should be installed and which parking spaces should have parking sensors installed within them. Block 950 may be performed by marking up the map or rendering obtained at block 910. In response to block 950, the parking facility may have the parking sensors and radar-based vehicle detectors installed. Method 800 may be performed following method 900.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for monitoring occupancy of multiple parking spaces, the system comprising:
   a radar-based vehicle detector that comprises a radar antenna that has a field-of-view of a portion of a parking facility, wherein:
      the portion of the parking facility comprises a first set of parking spaces of the parking facility; and
      the portion of the parking facility excludes a second set of parking spaces of the parking facility;
   a plurality of parking space sensors, wherein:
      the plurality of parking space sensors is only installed in the second set of parking spaces;
   a parking host system that communicates with the radar-based vehicle detector and the plurality of parking space sensors, wherein the parking host system is configured to:
      analyze data received from the radar-based vehicle detector;
      analyze data received from the plurality of parking space sensors; and
      output indications of parking spaces of the parking facility that are occupied based on the analyzed data received from the radar-based vehicle detector and the data received from the plurality of parking space sensors.

2. The system for monitoring the occupancy of the multiple parking spaces of claim 1, further comprising:
   a camera, wherein license plate recognition is performed on images captured by the camera and a license plate number is linked to a vehicle that enters the parking facility.

3. The system for monitoring the occupancy of the multiple parking spaces of claim 2, wherein the parking host system is further configured to:
   receive one or more images from the camera;
   determine the license plate number of the vehicle from the one or more images;
   link the license plate number with the vehicle; and
   track movement of the vehicle within the parking facility based on data from the radar-based vehicle detector.

4. The system for monitoring the occupancy of the multiple parking spaces of claim 3, wherein the parking host system is further configured to:
   determine the vehicle linked with the license plate number has parked in a parking space of the parking facility, wherein an indication of the indications indicates the parking space and the license plate number.

5. The system for monitoring the occupancy of the multiple parking spaces of claim 1, wherein the parking host system is further configured to:
   determine that detection of a vehicle is obstructed by one or more obstacles within the parking facility; and
   based on the data received from the radar-based vehicle detector and the data received from the plurality of parking space sensors, determine the vehicle is parked within a parking space of the first set of parking spaces or the second set of parking spaces.

6. The system for monitoring the occupancy of the multiple parking spaces of claim 1, wherein the parking host system is further configured to:
   track movement of a vehicle within the parking facility based on data from the radar-based vehicle detector;
   after tracking movement, determine that detection of the vehicle is obstructed by one or more obstacles within the parking facility; and
   determine that the vehicle has parked within a parking space in which a parking space sensor of the plurality of parking space sensors is installed based on a location where the vehicle was last tracked and the parking space sensor indicating vehicle occupancy.

7. The system for monitoring the occupancy of the multiple parking spaces of claim 1, wherein the parking host system further comprises:
   a second radar-based parking space monitor that is installed in a different location from the radar-based vehicle detector and has a second field-of-view that overlaps the field-of-view.

8. The system for monitoring the occupancy of the multiple parking spaces of claim 1, wherein the parking facility is a parking garage.

9. The system for monitoring the occupancy of the multiple parking spaces of claim 1, wherein the parking host system is part of a gateway device that serves as an interface between a cloud-based server system and the plurality of parking space sensors.

10. The system for monitoring the occupancy of the multiple parking spaces of claim 1, further comprising:
    an output display device that indicates whether each parking space of the parking facility is occupied based on the output indications.

11. A method for determining where a vehicle has parked, the method comprising:
    tracking, using one or more radar-based vehicle detectors, the vehicle moving within a parking facility that comprises a plurality of parking spaces;
    analyzing data obtained from one or more parking space sensor, wherein:
       each parking space sensor of the one or more parking space sensors is located within a parking space and monitors whether any vehicle is present within only the parking space; and
       the one or more parking space sensors are installed only in a set of parking spaces that includes parking spaces that are partially or fully outside a field-of-view of the one or more radar-based vehicle detectors;
    determining a parking space in which the vehicle has parked based on tracking the vehicle using the one or more radar-based vehicle detectors and analyzing the data obtained from the one or more parking space sensors; and
    outputting an indication that the parking space is occupied.

12. The method for determining where the vehicle has parked of claim 11, wherein determining the parking space comprises:
   determining that the vehicle moving within the parking facility has left the field-of-view of the one or more radar-based vehicle detectors.

13. The method for determining where the vehicle has parked of claim 12, wherein determining the parking space further comprises:
   determining that a parking space sensor of the one or more parking space sensors that is located outside the field-of-view of the one or more radar-based vehicle detectors indicates that the parking space in which the parking space sensor is located is now occupied.

14. The method for determining where the vehicle has parked of claim 13, wherein determining the parking space further comprises:
   determining that the parking space sensor indicating that the parking space is now occupied is due to the vehicle based on less than a threshold amount of time elapsing from when the vehicle left the field-of-view of the one or more radar-based vehicle detectors and the parking space sensor indicating that the parking space is now occupied.

15. The method for determining where the vehicle has parked of claim 14, wherein determining the parking space further comprises:
   determining that the parking space sensor is located in a region of the parking facility to which the vehicle had access based on where the vehicle left the field-of-view of the radar-based vehicle detector.

16. The method for determining where the vehicle has parked of claim 11, further comprising detecting the vehicle entering the parking facility.

17. The method for determining where the vehicle has parked of claim 16, further comprising determining a license plate number of the vehicle.

18. The method for determining where the vehicle has parked of claim 11, further comprising:
   obtaining a map of the parking facility; and
   determining one or more locations for the one or more radar-based vehicle detectors that decreases a number of parking space sensors needed to effectively monitor the plurality of parking spaces.

19. The method for determining where the vehicle has parked of claim 18, wherein effectively monitoring the plurality of parking spaces comprises accurately determining whether any vehicle is present within each parking space greater than a defined accuracy threshold.

20. The method for determining where the vehicle has parked of claim 18, further comprising performing a simulation to determine parking spaces of the plurality of parking spaces for which the one or more radar-based vehicle detectors are insufficient to accurately determine whether any vehicle is present within the parking spaces greater than the defined accuracy threshold.

* * * * *